United States Patent
Paglieroni et al.

(10) Patent No.: US 8,081,798 B2
(45) Date of Patent: Dec. 20, 2011

(54) METHOD AND SYSTEM FOR DETECTING POLYGON BOUNDARIES OF STRUCTURES IN IMAGES AS PARTICLE TRACKS THROUGH FIELDS OF CORNERS AND PIXEL GRADIENTS

(75) Inventors: David W. Paglieroni, Pleasanton, CA (US); Siddharth Manay, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 619 days.

(21) Appl. No.: 12/275,177

(22) Filed: Nov. 20, 2008

(65) Prior Publication Data

US 2009/0252373 A1     Oct. 8, 2009

Related U.S. Application Data

(60) Provisional application No. 60/989,319, filed on Nov. 20, 2007.

(51) Int. Cl.
*G06K 9/00* (2006.01)
(52) U.S. Cl. ........................................... 382/103
(58) Field of Classification Search .................. None
See application file for complete search history.

(56) References Cited

U.S. PATENT DOCUMENTS

| | | | |
|---|---|---|---|
| 5,982,909 A * | 11/1999 | Erdem et al. | 382/103 |
| 6,211,882 B1 | 4/2001 | Pearce | |
| 6,463,400 B1 | 10/2002 | Barkley-Yeung | |
| 6,621,917 B1 | 9/2003 | Vilser | |
| 6,735,343 B2 * | 5/2004 | Michael | 382/241 |
| 7,184,938 B1 | 2/2007 | Lansford | |

OTHER PUBLICATIONS

A. Doucet, S. Godsill and C. Andrieu, "On Sequential Monte Carlo Sampling Methods for Bayesian Filtering", Statistics and Computing, vol. 10, No. 3, 2000, pp. 197-208.
N. Gordon, D. Salmond and A. Smith, "Novel Approach to Nonlinear/Non-Gaussian Bayesian State Estimation", IEEE Proc.-F, vol. 140, No. 2, 1993, pp. 107-113.
H. Kim, W. Choi and H. Kim, "A Hierarchical Approach to Extracting Polygons Based on Perceptual Grouping", IEEE Int. Conf. Sys. Man, Cybernetics, vol. 3, Oct. 1994, pp. 2402-2407.
W. Grimson and T. Lozano-Perez, "Localizing Overlapping Parts by Searching the Interpretation Tree", IEEE Trans. PAMI, vol. 9, No. 4, Jul. 1987, pp. 469-482.
S. Manay and D. Paglieroni, "Matching Flexible Polygons to Fields of Corners Extracted from Images," Int'l Conf. on Image Analysis and Recognition, Nov. 2007.
J. McGlone and J. Shufelt, "Projective and Object Space Geometry for Monocular Building Extraction", CVPR 1994, pp. 54-61.

(Continued)

*Primary Examiner* — Tom Y Lu
(74) *Attorney, Agent, or Firm* — James S. Tak

(57) ABSTRACT

A stochastic method and system for detecting polygon structures in images, by detecting a set of best matching corners of predetermined acuteness α of a polygon model from a set of similarity scores based on GDM features of corners, and tracking polygon boundaries as particle tracks using a sequential Monte Carlo approach. The tracking involves initializing polygon boundary tracking by selecting pairs of corners from the set of best matching corners to define a first side of a corresponding polygon boundary; tracking all intermediate sides of the polygon boundaries using a particle filter, and terminating polygon boundary tracking by determining the last side of the tracked polygon boundaries to close the polygon boundaries. The particle tracks are then blended to determine polygon matches, which may be made available, such as to a user, for ranking and inspection.

9 Claims, 4 Drawing Sheets

OTHER PUBLICATIONS

M. Mueller, K. Segl and H. Kaufmann, "Edge and Region-Based Segmentation Technique for the Extraction of Large, Man-Made Objects in High-Resolution Satellite Imagery", Pattern Recognition, vol. 37, 2004, pp. 1619-1628.

S. Noronha and R. Nevatia, "Detection and Modeling of Buildings from Multiple Aerial Images", IEEE Trans. PAMI, vol. 23, No. 5, May 2001, pp. 501-518.

C. Olson and D. Huttenlocher, "Automatic Target Recognition by Matching Oriented Edge Pixels", IEEE Trans. Image Processing, vol. 6, No. 1, Jan. 1997, pp. 103-113.

D. Paglieroni, W. Eppler, and D. Poland, "Phase Sensitive Cuing for 3D Objects in Overhead Images," In *SPIE Defense and Security Symposium: Signal Processing, Sensor Fusion and Target Recognition XIV, Proc. SPIE*, vol. 5809, pp. 28-30, Mar. 2005.

D. Paglieroni and S. Manay, "Signal-to-Noise Behavior for Matches to Gradient Direction Models of Corners in Images", SPIE Defense and Security Symposium, Apr. 2007.

B. Ristic, S. Arulampalam and N. Gordon, Beyond the Kalman Filter: Particle Filters for Tracking Applications, Artech House, 2004, Chapter 3.

Y. Shan and Z. Zhang, "Corner Guided Curve Matching and its Application to Scene Reconstruction", CVPR 2000, vol. 2, pp. 796-803.

B. Song, I. Yun and S. Lee, "A Target Recognition Technique Employing Geometric Invariants", Pattern Recognition, vol. 33, 2000, pp. 413-425.

C. Lin and R. Nevatia, "Building Detection and Description from a Single Intensity Image", Cornput. Vis. Image Understanding, 72, 2, Nov. 1998, pp. 101-121.

* cited by examiner convex corner:

$\phi_k = \theta_k - \alpha_k/2 + \pi$ concave corner:

$\phi_k = \theta_k + (2\pi - \alpha_k)/2 = \theta_k - \alpha_k/2 + \pi$

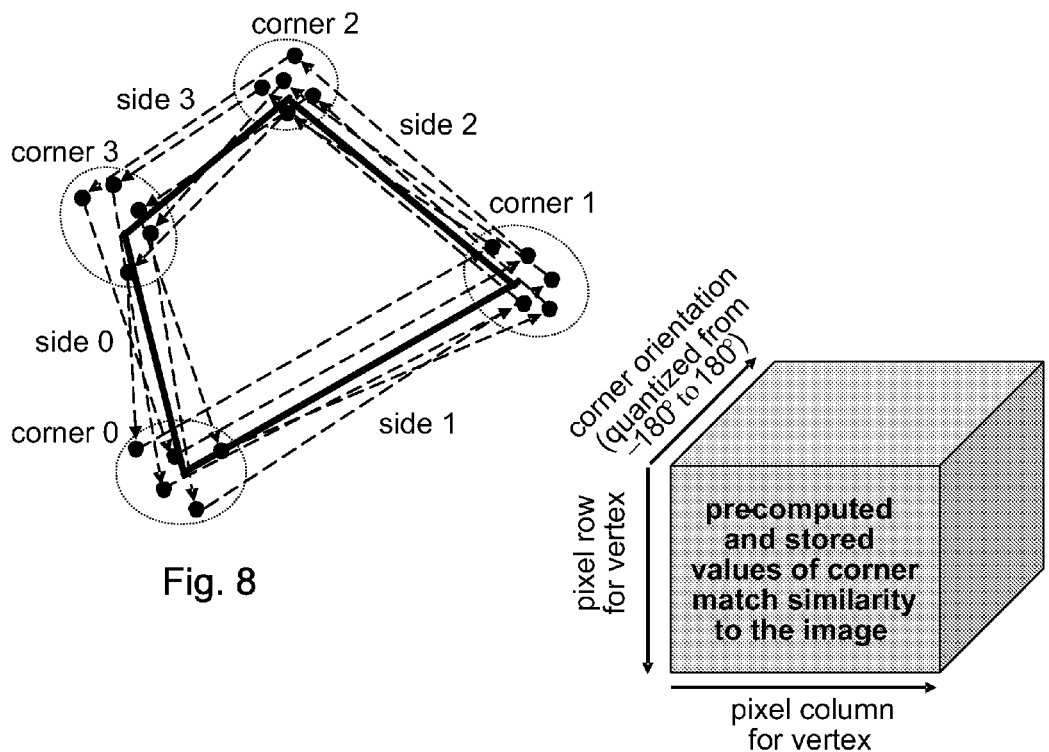
Fig. 8
Fig. 9
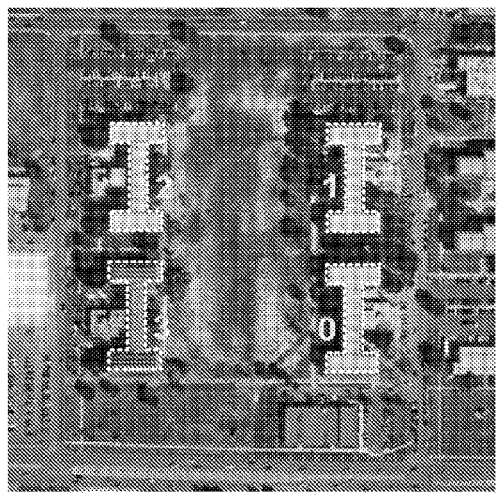
Fig. 11
Fig. 12

METHOD AND SYSTEM FOR DETECTING POLYGON BOUNDARIES OF STRUCTURES IN IMAGES AS PARTICLE TRACKS THROUGH FIELDS OF CORNERS AND PIXEL GRADIENTS

II. CLAIM OF PRIORITY IN PROVISIONAL APPLICATION

This application claims priority in provisional application filed on Nov. 20, 2007, entitled "Polygon Boundaries as Particle Tracks through Fields of Corners and Pixel Gradients" Ser. No. 60/989,319, by David W. Paglieroni et al, and incorporated by reference herein.

I. FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

III. FIELD OF THE INVENTION

The present invention relates to image processing methods, and more particularly to a method and system for detecting polygon structures of fixed shape and variable size in images by using particle filters and a Sequential Monte Carlo (SMC) sampling approach to stochastically track the boundaries of the polygon structures as particle tracks through fields of pixel gradients and corners detected in the images.

IV. BACKGROUND OF THE INVENTION

Many man-made objects and structures of interest in aerial/overhead images, such as for example roofs of buildings and vehicles, can be modeled with polygons. The ability to quickly and effectively match models for broad classes of polygons to such images is of great importance in semi-automatic content-based image search/database retrieval, image analysis, and image understanding applications that are throughput-intensive.

Template matching methods are sometimes used to match specific polygons. However, these methods typically cannot efficiently accommodate variations in polygon size. Polygons are thus more traditionally detected by extracting primitive features such as edges, lines or corners, and assembling collections of these features into polygons. Various methods of this type are known to handle variations in polygon size and even variations in relative side lengths, such as described, for example in "*Localizing Overlapping Parts by Searching the Interpretation Tree,*" by W. Grimson and T. Lozano-Perez (IEEE Trans. Pattern Anal. Mach. Intell., vol. 9, no. 4, July 1987, pp. 469-482) and "*Building Detection and Description from a Single Intensity Image,*" by C. Lin and R. Nevatia (Comput. Vis. Image Understanding, 72, 2, Nov. 1998, pp. 101-121.) However, such methods often miss polygons altogether even when only a few features are missing from the image. Even when partial matches to polygons can be found, they tend to be ranked much lower than complete matches of lesser quality.

What is needed therefore, is a robust method of detecting polygons in overhead imagery that is based on the modeling of polygons in a manner that accommodates whole classes of polygons (e.g. all L-shaped polygons at any position, orientation, and size, even if corner detection fails to detect or accurately localize all the required polygon corners.

V. SUMMARY OF THE INVENTION

One aspect of the present invention includes a method in a computer system for detecting polygon boundaries of structures in an image, comprising: receiving an image; detecting in said image a set of polygon corners each substantially matching one of n corner models of an n-sided polygon model based on directions of gradients in pixel gray-values of said image; initializing tracking of polygon boundaries by selecting pairs of corners from the set of detected polygon corners which match the first $0^{th}$ and last $(n-1)^{th}$ corners models of the u-sided polygon model, wherein each selected pair defines a first $0^{th}$ side of a corresponding one of the polygon boundaries; using a particle filter performing Sequential Monte Carlo sampling to track intermediate sides of the polygon boundaries after the first $0^{th}$ side up to and including a penultimate $(n-2)^{th}$ side, wherein the particles used in the particle filter characterize the states of the polygon boundary sides, and observations used in the particle filter characterize the match similarity between the set of detected polygon corners at locations and orientations predicted by the polygon model; terminating tracking of the polygon boundaries by determining the last $(n-1)^{th}$ sides thereof based on specified states of the sides of the polygon boundaries for the previous n-1 sides; and blending multiple particle tracks for the same polygon into a single boundary based on importance weights that reflect particle fitness, to produce an array of polygon matches detected in said image.

Another aspect of the present invention includes a method in a computer system for detecting polygon boundaries of structures in an image, comprising: computing a set of similarity values characterizing the degree of matching between an estimated gradient direction of each of M corner orientations of each pixel to a gradient direction model of a corner of predetermined acuteness α of a polygon model; determining a set of best matching corners from the set of similarity values by finding unambiguous local maxima of predetermined sufficient magnitude in the set of similarity values; initializing tracking of polygon boundaries by selecting pairs of corners from the set of detected polygon corners which match the first $0^{th}$ and last $(n-1)^{th}$ corners models of the n-sided polygon model, wherein each selected pair defines a first $0^{th}$ side of a corresponding one of the polygon boundaries; tracking intermediate sides of the polygon boundaries using a particle filter performing SMC sampling, including a penultimate $(n-2)^{th}$ side; terminating polygon boundary tracking by determining the last $(n-1)^{th}$ side of the tracked polygon boundaries based on boundary values up to the $(n-1)^{th}$ side, to close the polygon boundaries; and blending the polygon boundary tracks to produce polygon match data identifying polygon structures in the image.

And another aspect of the present invention includes a computer system for detecting polygon boundaries of structures in an image, comprising: input means for receiving the image; a first data processing module for detecting in said image a set of polygon corners each substantially matching one of n corner models of an n-sided polygon model based on directions of gradients in pixel gray-values of said image; a second data processing module initializing tracking of polygon boundaries by selecting pairs of corners from the set of detected polygon corners which match the first $0^{th}$ and last $(n-1)^{th}$ corners models of the n-sided polygon model, wherein each selected pair defines a first $0^{th}$ side of a corresponding one of the polygon boundaries; a third particle filtering module for performing Sequential Monte Carlo sampling to track intermediate sides of the polygon boundaries after the first $0^{th}$ side up to and including a penultimate $(n-2)^{th}$ side, wherein the particles used in the particle filter characterize the states of the polygon boundary sides, and observations used in the particle filter characterize the match similarity between the set of detected polygon corners at locations and orientations predicted by the polygon model; a fourth data processing module for terminating tracking of the polygon boundaries by determining the last $(n-1)^{th}$ sides thereof based on specified states of the sides of the polygon boundaries for the previous n−1 sides; and a fifth data processing module for blending multiple particle tracks for the same polygon into a single boundary based on importance weights that reflect particle fitness, to produce an array of detected polygon matches; output means for making the array of detected polygon matches available for use.

VI.

BRIEF DESCRIPTION OF THE DRAWINGS

The accompanying drawings, which are incorporated into and form a part of the disclosure, are as follows:

FIG. 8 is a schematic view illustrating five sequential Monte Carlo (SMC) boundary tracks (shown as dashed arrows), and one blended track (shown as solid lines) for a four-sided polygon, with each dashed arrow representing one particle.

FIG. 9 is a schematic view of a discrete 3D particle tracking space for polygon boundaries, comprising pre-computed similarity values (degree of matching to a corner model) for each position (pixel column, pixel row) and corner orientation (θ).

FIG. 11 is an example overhead image of an urban area, showing matching results for polygons with constrained side lengths for I-shaped building roofs, indicated as broken lines.

FIG. 12 is an example overhead image of an urban area, showing matching results for polygons with constrained side lengths for rectangular building roofs, indicated as broken lines.

VII. DETAILED DESCRIPTION

1. Introduction

Figure 2:
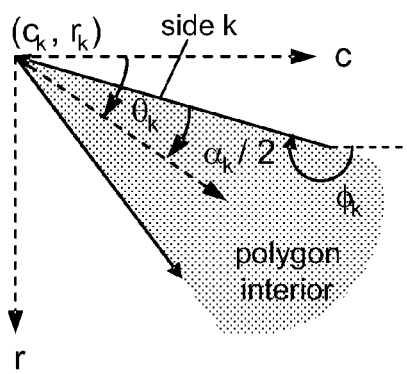
FIG. 2 is a schematic view of a convex corner of a polygon, illustrating counter-clockwise polygon boundary traversal, as well as the geometry for computing the pointing direction $\phi_k$ of side k from corner acuteness $\alpha_k$ and corner orientation $\theta_k$.

The present invention is a stochastic sampling approach using particle filters to detect polygons of fixed shape and variable size in images, especially polygon-shaped man-made structures, objects, landmarks, etc. in overhead imagery, such as for example the roofs of buildings and vehicles. In particular, a sequential Monte Carlo (SMC)) sampling approach is used to track polygon boundaries through 3D arrays of corner model similarity values/scores (and preferably 2D arrays of thresholded corner best matches derived from the 3D arrays) which are pre-computed across all possible corner/vertex locations and orientations in the image. For each polygon match, the method of the present invention combines many attempts based on SMC sampling to track a single polygon boundary, and is not based on single attempts to match polygon models to images as in other methods. This is illustrated in FIG. 8, showing five SMC boundary tracks (shown as dashed arrows), and one blended track (shown as solid lines) produced by the present invention for a four-sided polygon, with each dashed arrow representing one particle. It is notable that the SMC sampling relies on the corner similarity scores, but not the detected corners themselves. As such, this approach can detect polygons even if the corner detector failed to detect or accurately localize all the required corners (a realistic concern for most imaging applications). Undetected corners and sides are handled by adjusting the importance of missing corners relative to missing sides. It is also notable that the present invention relies on a polygon model that describes a polygon as a sequence of corners and sides. This allows polygons to be matched despite changes in position, orientation, and scale; polygons of fixed shape and size or polygons of fixed shape and variable size may be matched. In this manner, the method of the present invention is robust to real-world imaging conditions, especially for overhead images.

The method and system of the present invention may be generally characterized as having three categories of processing: (1) corner detection, (2) tracking polygon boundaries as particle tracks using a particle filter, and (3) polygon matching via blending of particle tracks. The corner detection category in particular may be decomposed into a corner model matching step which produces the 3D array of similarity scores, and a step for detecting best corner matches which produces a 2D array of best corner matches by thresholding the similarity values produced in the corner model matching step. In the corner model matching step, the selected gradient direction model of a corner is first matched against estimated pixel gray values for the various pixel positions and corner orientations of the image, to directly localize the corners in the image, and not by detecting line segments in the image followed by computing the intersections of these line segments. This produces the pre-computed similarity values/scores for all possible locations and corner orientations in the image, and shown as a 3D particle tracking space in FIG. 11.

And the tracking polygon boundaries category may be decomposed into the steps of initialization of polygon tracks, tracking boundaries, and terminating the particle tracks. Generally, particle tracks are generated through the fields of corners and pixel gradients (i.e. the array of similarity values) as attempts to match polygon boundaries. There is one state vector and one set of measurement (observation) features associated with each particle. The state vector captures geometric information about a single corner and side, and its value is influenced by the polygon model (a sequence of [corner acuteness, side length] parameter pairs). The measurement (observation) features capture photometric information about a single corner and side derived from pixel gray values in the image. The measurements have corner and edge similarity components based on gradient direction matches to the image. By adjusting weights on these components, boundary tracks may be ranked based more on evidence of polygon corners or more on evidence of polygon edges in the image.

Figure 10:
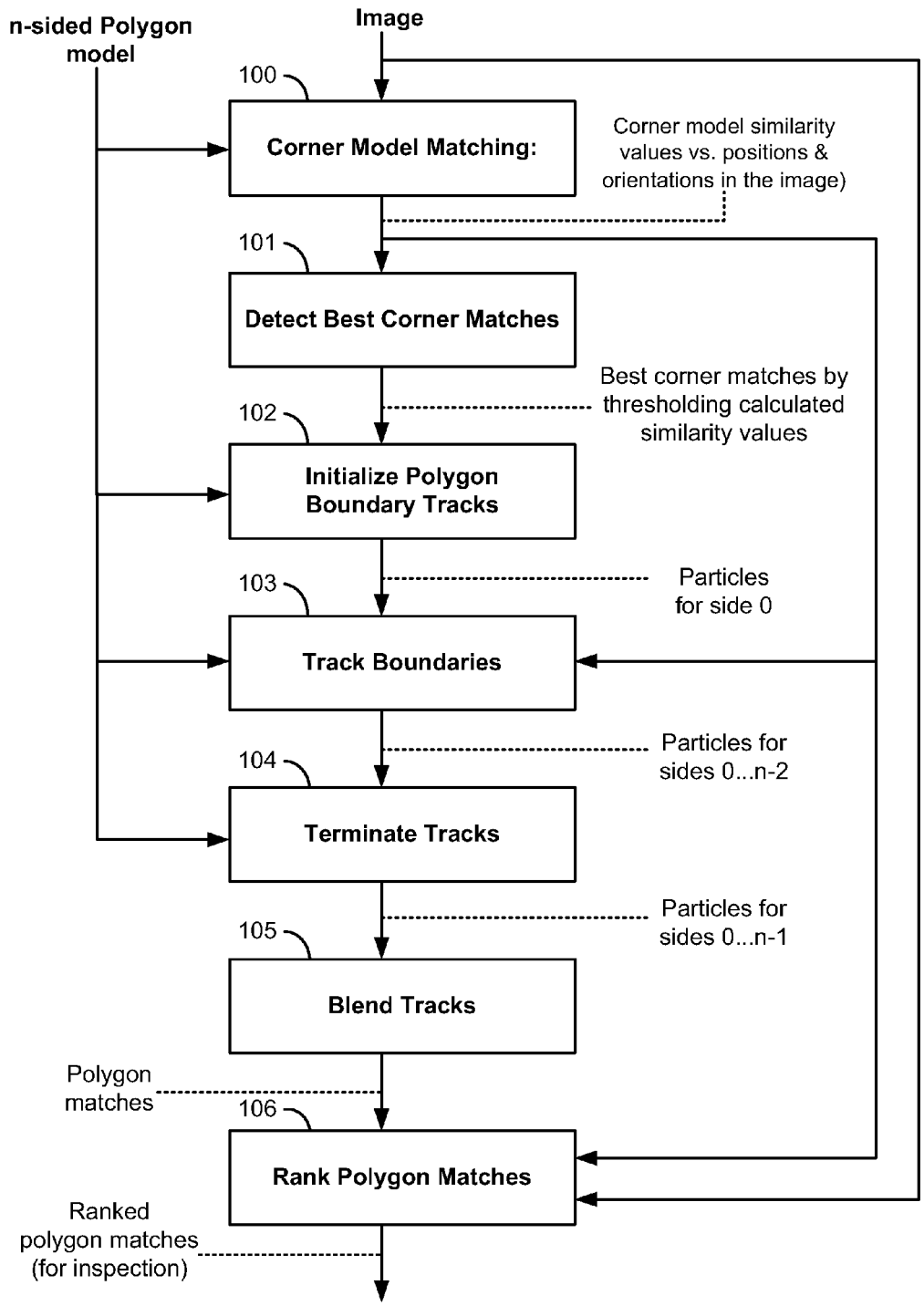
FIG. 10 is an overview flowchart of the particle-based polygon detection method and system of the present invention.

FIG. 10 shows an example embodiment of the present invention incorporating the above steps. Upon first receiving an image and selecting an n-sided polygon model, the method steps generally include: corner model matching 100, detecting best corner matches 101, initializing polygon boundary tracks 102 (from pairs of detected best corner matches consistent with the some side in the polygon model), tracking boundaries 103 (n−2 iterations), terminating tracks 104, and blending the particle tracks 105 which produces polygon matches in the image, as previously described with respect to FIG. 8. An optional last step 106 is also shown which ranks polygon matches to produce a ranked set of polygon matches, which may be used for inspection and evaluation of the polygons.

It is appreciated, that while the polygon boundary detection method of the present invention is particularly well suited for overhead imagery applications, it may alternatively be applied in various application domains requiring polygon detection in general, such as for example circuit board inspection applications. However, the primary utility and purpose of detecting polygon structures in images as provided by the present invention may be particularly understood and appreciated as applied to such overhead imagery applications as cueing, site modeling, and classification of land development, to name a few. In the case of cueing, human attention may be focused on precise locations of certain types of buildings which are detected within overhead images of massively broad areas. In site modeling applications, site models may be generated in a semi-automatic manner from overhead images containing man-made structures. And in land development classification applications, land regions may be classified within massively broad areas based on population densities for various types of man-made structures detected in overhead images.

Furthermore, it is appreciated that the polygon matching methodology of the present invention may be implemented in a useful manner on a computer system as hardware, firmware, or software as known in the art. In such a system, overhead images are provided as data input to the method by conventional means known in the art, with detection output of the detected polygon boundaries made available for use, such as for example graphically displayed on a monitor, stored in a database for later retrieval, or otherwise made available for observation and/or use by a user.

In the following discussion, Section 2 describes the models of corners and polygons used in the present invention. Section 3 describes the gradient direction matching (GDM)-based steps employed in detecting the best polygon corner matches used in the method of the present invention. Sections 4 and 5 describe the state variables and the measurement variables, respectively, used for the polygon boundary track particles used in the boundary tracking steps. Section 6 describes the particle-based boundary tracking steps for polygons with constrained Side Lengths. And Section 7 is an appendix with example algorithms used for implementing the process steps of the present invention. The method and system of the present invention is described for polygons with constrained side lengths so as to accommodate variations in polygon position, orientation, and possibly size.

2. Models of Corners and Polygons
2.1 Polygon Model

The present invention models polygons in the image plane as sequences of corners and side lengths, with the ordering of the corners and sides chosen to follow either a clockwise or counterclockwise traversal convention along the polygon boundary. In particular, let $\mathcal{P}^*$ be a polygon with n sides (and thus n corners):

$$\mathcal{P}^* = \{[\alpha_k^*, l_k^*] \, k=0 \ldots n-1\} \quad (2.1)$$

$\alpha_k^* \in [0, 2\pi)$ is the acuteness of corner k. $\alpha < \pi$ for convex corners and $\alpha > \pi$ for concave corners ($\alpha \neq \pi$). In practice, $\alpha \in (\epsilon_\alpha, \pi - \epsilon_\alpha) \cup (\pi + \epsilon_\alpha, 2\pi - \epsilon_\alpha)$ for some $0 < \epsilon_\alpha \leq \pi/4$. And $l_k^* \geq 0$ is the length parameter for side k. Side k emanates from corner (k−1) mod n and terminates on corner k. Various types of polygon models characterized by equation (2.1) may be employed in the present invention, e.g. squares, rectangles, triangles, etc. According to the chosen polygon model For each type of Polygon models of form specified in equation (2.1) are invariant to shape position and orientation. The degree of invariance beyond position and orientation is regulated by the sequence of length parameters $l_k^*$ as follows:

1. translation-rotation invariance (absolute side length constraints)
   If $l_k^* > 0$ for k=0 ... n−1, then the length of side k is $L_k^* = l_k^*$ for k=0 ... n−1. In this case, the exact dimensions of all sides are specified, so polygon shape and size are fixed.
2. scale-translation-rotation invariance (relative side length constraints)
   Let $L_0$ be the length of side 0 for some match to $\mathcal{P}^*$. For that match, if $l_k^* = 0$ only for k=0, then the length of side k is $= l_k^*/L_0$ for k=1 ... n−1. In this case, the relative dimensions of all sides are specified, so polygon shape is fixed but size can vary.

2.2 Geometric Model for Polygon Corners

Figure 3:
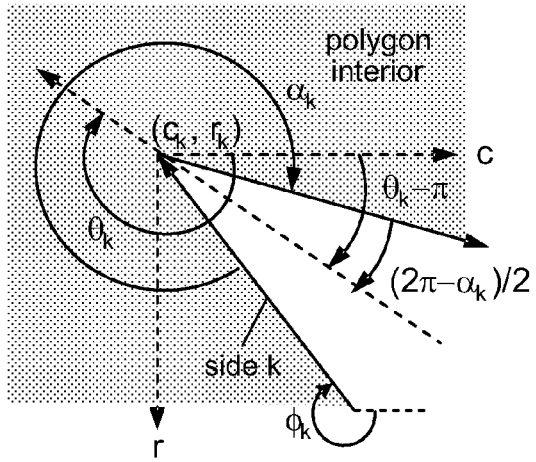
FIG. 3 is a schematic view of a concave corner of a polygon, illustrating counter-clockwise polygon boundary traversal, as well as the geometry for computing the pointing direction $\phi_k$ of side k from corner acuteness $\alpha_k$ and corner orientation $\theta_k$.
Figure 1:
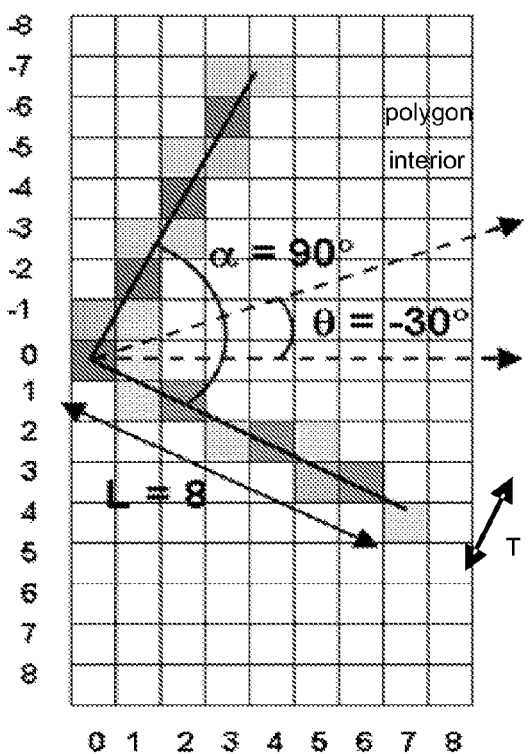
FIG. 1 is a graph illustrating a model of a corner used in the present invention.

FIG. 1 shows a geometric model of a polygon corner k having several attributes: (1) vertex at column and row pixel location $[c_k, r_k]$ (shown as [0,0]), (2) corner acuteness $\alpha_k \in (0, 2\pi) \neq \pi$ (shown as $\alpha = 90°$), (3) corner orientation $\theta_k \in (0, 2\pi)$ defined such that the corner bisector points into the interior of the polygon (shown as $\theta = -30°$), (4) corner leg length $L_k > 0$ (shown as L=8), and (5) corner leg thickness $T_k > 0$. The corner k and its vertex having pixel coordinates are used interchangeably herein. And FIGS. 2 and 3 illustrate the corner model as a convex corner and a concave corner, respectively, as indicated by the location of the "polygon interior" label. In either case, the angle $\phi_k \in (0, 2\pi)$ is defined as the pointing direction for side k (which terminates at vertex k at pixel location $[c_k, r_k]$) can be expressed in terms of $\theta_k$ and $\alpha_k$ as:

$$\phi_k = (\theta_k - \alpha_k/2 + \pi) \bmod 2\pi \quad (2.2)$$

or $$\theta_k = (\phi_k + \alpha_k/2 - \pi) \bmod 2\pi \quad (2.3)$$

2.3 Gradient Direction Model for Polygon Corners

Furthermore, and building upon the geometric model for polygon corners, a gradient direction model for a corner k is described here for use in computing the gradient direction matching (GDM) feature for corners (i.e. corner similarity values) in section 3. The gradient direction model for corners is defined by the set $\mathcal{C}$ of pixels on the corner legs (the shaded pixels in FIG. 1), a gradient direction $\beta(c,r)$, and a weight $w(c,r) \, \forall \, [c,r] \in \mathcal{C}$. (The gradient direction model for the side of a polygon is similar, except one leg is missing. This is discussed in section 5.2) For the gradient direction model for corners, let us assume for convenience that [c,r]=[0,0] for the vertex. $\beta(c,r) \in [-\pi, \pi)$ is the direction of the normal to the leg or side that contains pixel [c,r]. All pixels [c,r] on the same leg or polygon side have the same β(c,r) value. For corner models, we exclude the vertex from $\mathcal{C}$ (its β value is ambiguous because it lies on both legs). For each (c,r)∈$\mathcal{C}$, the weights of the model pixels decrease linearly from 1 to 0 as the distance to the ideal leg or line segment $\mathcal{L}$ that contains them increases from 0 to T, and they remain at 0 beyond T:

$$w(c,r) = \max[0, 1-d([c,r], \mathcal{L})/T] \in [0,1] \quad (3.2)$$

Also, the weights are normalized so that they sum to one:

$$w(c, r) \leftarrow w(c, r) \bigg/ \sum_{(c',r') \in P} w(c', r') \quad (3.3)$$

3. Polygon Corner Detection Based on Similarity Scores/Values of Gradient Direction Model of a Corner to Estimated Pixel Gradient Directions of the Image A feature based on pixel gradient directions θ(c,r) that is sensitive to corners of prescribed acuteness α is called a gradient direction matching (GDAM) feature for corners, which is an observation or measurement made directly from pixel gray values. The GDM feature for corners represents the degree of match or similarity between gradient directions θ(c,r) estimated from pixel gray values (Section 3.1) and the gradient direction model of a corner (acuteness α, orientation θ) at pixel [column, row] location [c,r] (Section 2.3). The gradient direction model for a polygon corner described in section 2.3 is applied against an image (which may be, for example, received in real-time or made available from data storage) to detect the best matching corners of polygon structure in the image. In particular, the corner detection is based on computing similarity values (degree of matching) of the gradient direction model of a corner to estimated pixel gradient direction of the image.

Use of gradient directions is motivated by the desire to develop a corner detector that is robust to variations in image acquisition conditions, imaging sensor, and scene content. For example, it has been demonstrated that pixel gradient directions are more robust than features based on edges or pixel contrast for matching 3D edge models of objects to overhead images. As suggested in the publication, "Signal-to-Noise Behavior for Matches to Gradient Direction Models of Corners in Images," by D. Paglieroni and S. Manay, SPIE Defense & Security Symposium, 9-13 Apr. 2007", incorporated by reference herein, the same is likely to be true for corner detection.

As discussed previously, 0<α<π for convex corners, and π<α<2π for concave corners. Since corner detectors cannot in general distinguish convexity from concavity, the corner models matched to arrays of pixel gradient directions can be restricted to acuteness values α between 0 and π. Corner concavities and convexities are determined not when corners are detected, but rather as polygon boundaries are being tracked.

3.1 Pixel Gradient Estimation

Let u(c,r) be the gray value in an image u for the pixel at column and row [c,r]. The direction of gradients ù(c,r) in pixel value can be estimated as a weighted sum of direction vectors from the center of pixel [c,r] to the centers of neighbor pixels [c',r']. Weights on these direction vectors are based on differences in pixel values and distances between [c,r] and [c',r']:

$$\dot{u}(c, r) \triangleq A(c, r) e^{j\theta(c,r)} \approx \quad (3.1)$$
$$\sum_{(c',r') \in R(c,r|\rho)} [u(c', r') - u(c, r)] \cdot \frac{(c' - c) + j(r' - r)}{[(c' - c)^2 + (r' - r)^2]^{k/2}}$$

In equation (3.1), A(c,r) represents gradient magnitude, and θ(c,r) represents gradient direction. The gradient estimates are based on pixels that lie in a region R(c,r|ρ) of radius ρ centered on [c,r]. The power k≧0 on Euclidean distance d from [c',r'] to [c,r] regulates how the weight assigned to a neighbor [c',r'] varies with d. For a fixed value of d>1, the reduction in weight becomes more drastic as k increases. Typical values of ρ and k are (ρ, k)=(1,0) for Prewitt estimates and (ρ, k)=(1,2) for Sobel estimates of gradient direction.

3.2 Gradient Direction Matching (GDM) Feature for Corners of Polygons: Creation of the 3D Particle Tracking Space for Polygon Boundaries Let $\mathcal{C}(\theta,\alpha)$ be the set of pixels on the legs of a corner of acuteness α at orientation θ (excluding the vertex). The GDM feature for polygon corner k is $$s_C(c_k, r_k, \theta_k | \alpha_k) = \quad (3.4)$$
$$\sum_{(c,r) \in \mathcal{C}(\theta_k, \alpha_k)} a(c + c_k, r + r_k) \cdot w(c, r) \cdot \cos^2[\theta(c + c_k, r + r_k) - \beta(c, r)]$$

where $$a(c, r) = \begin{cases} 1 & A(c, r) \geq A_{contrast} \\ 0 & \text{otherwise} \end{cases} \quad (3.5)$$

is used to mask out gradient direction estimates for low-contrast pixels, which tend to be noisy (say $A_{contrast} \approx 12$). Equation 3.4 is the similarity value, score, or measurement of the particular position and corner orientation to the gradient direction model for the corner. In this manner, corner similarity values are computed for all positions in the image and associated corner orientations. As illustrated in FIG. 9, the values $s_C(c, r, \theta | \alpha)$ (which are indexed by column, row, and orientation) comprise a discretized 3D data space, which is used as a particle tracking space. For each distinct value of corner acuteness α represented in polygon model $\mathcal{P}^*$, the GDM algorithm generates one corner similarity field {$s_C(c, r, \theta | \alpha)$} from gradient image ù(c,r) for each of M corner orientations $\theta_k$, k=0 . . . M−1. When fully correlated, the model and pixel gradient directions are the same or opposite everywhere, and $s_C(c, r, \theta | \alpha)$=1. When fully anti-correlated, the model and pixel gradient directions are orthogonal everywhere, and $s_C(c, r, \theta | \alpha)$=0. When a structured model is matched to an unstructured (random) gradient direction field, one can expect $s_C(c, r, \theta | \alpha) \approx 0.5$. Corner matching efficiency improves significantly when gradient direction models of corners are rasterized and $s_C(c, r, \theta | \alpha)$ is computed in the Fourier domain using the FFT.

3.3 Detection of Best Matching Corners from the Corner Similarity Measurements For a corner model with legs of length L pixels, it has been demonstrated empirically that it is sufficient to choose M close to πL (half the circumference of a circle with a radius of L pixels). By choosing the number of model orientations to be the multiple of 8 closest to πL, i.e., $$M = 8 \cdot \text{int}\left[\frac{\pi L}{8} + 0.5\right] \qquad (3.6)$$

the number of corner models whose legs occur at orientations of $k\pi/4$, $k=0 \ldots 7$ is maximized (these are the legs that map most cleanly to the pixel grid). Note that because our detector is not invariant to corner orientation, the number of corner model orientations to match, and thus the computational complexity of corner detection, increase linearly with leg length. Also, since the detector is not invariant to corner acuteness, multiple models are needed for multiple corner acutenesses, although in practice, each model can be used for a range of acutenesses. The orientations of the corner models are $$\theta_k = \frac{2\pi k}{M} + \frac{\alpha}{2}, k = 0 \ldots M - 1 \qquad (3.7)$$

For a specific corner acuteness $\alpha \in [0,\pi)$, the corner similarity $$s_C^*(c, r \mid \alpha) \triangleq \max_\theta s_C(c, r, \theta \mid \alpha) \qquad (3.8)$$

corresponding to the best match over all corner orientations can be computed on a per-pixel basis. It is notable that this step transforms the 3D space of FIG. 9 into a 2D array $\{s_C^*(c, r|\alpha)\}$.

Best matching corners $\{[c_k, r_k, \theta_k, \alpha]\}$ of acuteness $\alpha$ are detected by finding unambiguous local maxima of sufficient magnitude in the 2D array $\{s_C^*(c, r|\alpha)\}$ of optimal GDM feature values. The detection rule for corners requires the model match to exceed some critical value $s_{crit} > 0.5$ and to be an unambiguous local maximum within a neighborhood of radius $\Delta$ (the disambiguation distance):

$$s_C^*(c, r \mid \alpha) \geq s_{crit} \text{ and } s_C^*(c, r \mid \alpha) = \max_{(c', r') \in R(c, r|\Delta)} s_C^*(c', r' \mid \alpha) \qquad (3.9)$$

$\{_C^*(c,r|\alpha)\}$ can be partially disambiguated in one pass using the idea that no pixels within a circle of radius $\Delta/2$ are separated by more than $\Delta$. Each pixel $[c,r]$ in $\{s_C^*(c,r|\alpha)\}$ is visited in row order. If pixel $[c,r]$ has not yet been eliminated as a redundant match, search $R(c,r|\Delta/2)$ for the largest s value $(s_{max})$, and eliminate all $[c',r'] \in R(c,r|\Delta/2)$ for which $s(c',r') < s_{max}$.

Figure 4:
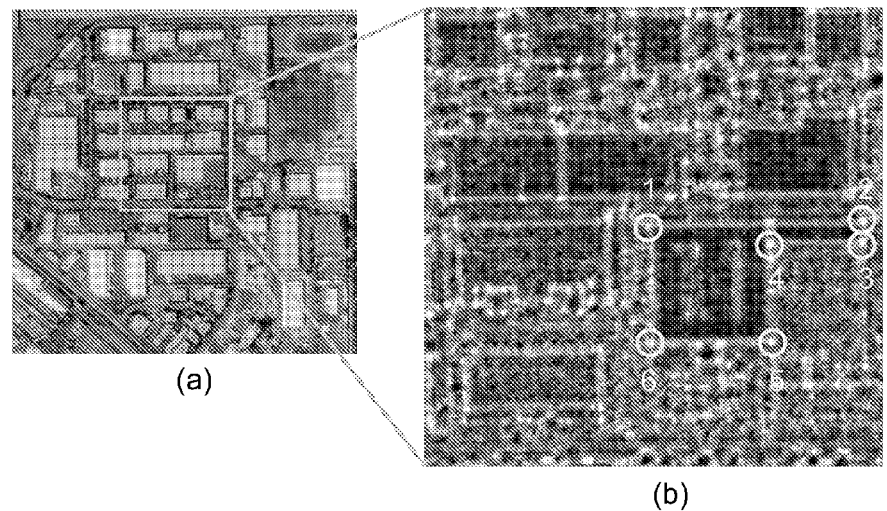
FIG. 4 is an example overhead image of an urban area, and an example GDM surface for a block within the example overhead image with respect to a corner model for which [α, L, T]=[π/2, 6, 1], and showing unambiguous local maxima (right angle corner detections).

Partial disambiguation quickly eliminates most, but not necessarily all redundant matches. The exhaustive algorithm for disambiguating a list of m partially disambiguated matches is simple, has worstcase $O(m^2)$ complexity, and minimal memory requirements. Each match $i=0 \ldots m-1$, is compared only to matches $i+1 \ldots m-1$ further down the list that have not yet been flagged as ambiguous. Matches further down the list are flagged once found to be ambiguous. Complexity can be reduced to $O(m)$ by dividing the image into adjacent virtual blocks (bins) of widths $\Delta$. The binning algorithm works in two passes. In a first pass through the list, the match of largest s value is assigned to each bin that contains at least one match, and in the process, some matches are flagged as ambiguous. In a second pass through the list, the ambiguity status of matches not previously flagged as ambiguous is determined by comparing them to all un-flagged matches that lie within 3×3 bin neighborhoods. An example of corner detection is provided in FIG. 4.

4. State Variables for Polygon Boundary Track Particles

The particle filter used in the present invention for polygon boundary tracking uses a state vector $x_k$ that characterizes the state of side k (as opposed to just the state of corner k). In this state definition, side k is defined by the location $[c_k, r_k]$ of corner k, and the ray $[\phi_k, L_k]$ that emanates from corner (k−1) mod n and terminates at corner k along side k of the polygon:

$$x_k = [c_k, r_k, \phi_k, L_k]^T \qquad (4.1)$$

This state vector captures geometric information about polygon corners and sides. Note that $\phi_k$ and $\theta_k$ are related by the polygon model according to equation (2.2). In particular, for $k=0$ (i.e. the initial side 0) the initial state vector $x_0 = [c_0, r_0, \phi_0, L_0]^T$ associated with side 0 of a polygon whose boundary is to be tracked is specified by a pair of corners $[c_0, r_0]$ and $[c_{n-1}, r_{n-1}]$ drawn from the field of corners detected as unambiguous matches to corners 0 and n−1 in the polygon model. (See section 6.1). For $k=n-1$, (i.e. the last $(n-1)^{th}$ side) see section 6.2. And for $0<k<n-1$ (i.e. the intermediate sides of the polygon track) and given side k−1, side k must satisfy general constraints imposed by polygon model $\mathcal{P}^*$:

$$L_k \approx \begin{cases} f_k^* & f_0^* > 0 \text{(absolute side length constraints)} \\ f_k^* L_0 & f_0^* = 0 \text{(relative side length constraints)} \end{cases} \qquad (4.3)$$

$$\phi_k \approx \phi_{k-1} - \pi + \alpha_{k-1}^* \qquad (4.4)$$

4.1 State Transition Density

For each particle $i=1 \ldots N$ and for all but the first and last side of the polygon (i.e. $0<k<n-1$, but not for $k=0$ or $k=n-1$), particle filters generate a new particle $x_k^i$ by sampling the state transition density $p(x_k|x_{k-1}^i)$ once. In our case, for some polygon, given the state $x_{k-1}^i$ of side k−1, $p(x_k|x_{k-1}^i)$ physically represents the density associated with the state of side k. The state transition density will now be discussed in detail. In the initial absence of training data, we replace the state transition density $p(x_k|x_{k-1})$ with a proposed state transition density $q(x_k|x_{k-1})$ designed to be suitable for polygon boundary tracking. The random state variables $c_k$, $r_k$, $\phi_k$, and $L_k$ can be sampled independently if $q(x_k|x_{k-1})$ is factored into four marginal univariate densities, namely $p(c_k|\bullet)$, $p(r_k|\bullet)$, $q(\phi_k|\bullet)$, and $q(L_k|\bullet)$.

Figure 5:
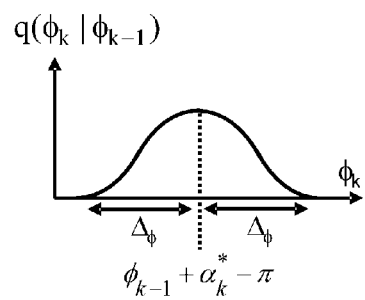
FIG. 5 is a graphical illustration of proposed state transition densities from which to draw samples of $\phi_k$.

According to equation (4.4) and as illustrated in FIG. 5, the pointing direction $\phi_k$ of side k depends on the pointing direction of side k−1 and the acuteness of corner k:

$$q(\phi_k \mid \phi_{k-1}) = \frac{w}{\Delta_\phi} \cdot \psi\left(\frac{\phi_k - \phi_{k-1} + \pi - \alpha_{k-1}^*}{\Delta_\phi/w}\right) \qquad (4.8)$$

In equation (4.8), $\psi(x)$ is a symmetric unimodal kernel function with mode at $x=0$ and domain $x \in (-w,w)$ (width 2w) that integrates to one. Examples of such kernel functions are the triangular pulse function of width 2, and the bicubic spline function $$\psi(x) = \begin{cases} x^3/2 - x^2 + 2/3 & |x| \leq 1 \\ -x^3/6 + x^2 - 2x + 4/3 & 1 < |x| < 2 \\ 0 & \text{otherwise} \end{cases} \qquad (4.9)$$

of width 4. In any case, $\psi(x)$ can be converted into a function with domain $x \in (-w\Delta_x, w\Delta_x)$:

$$\int_{-w\Delta_x}^{w\Delta_x} \frac{1}{\Delta_x} \psi\left(\frac{x}{\Delta_x}\right) dx = 1 \qquad (4.10)$$

$\Delta_\phi \geq 0$ expresses allowable uncertainty in the pointing direction. Note that $$\lim_{\Delta_\phi \to 0} q(\phi_k | \phi_{k-1}) = \delta(\phi_k - \phi_{k-1} + \pi - \alpha^*_{k-1}) \qquad (4.11)$$

Figure 6:
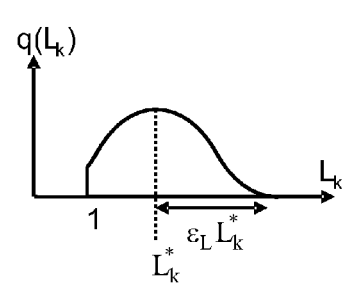
FIG. 6 is a graphical illustration of proposed state transition densities from which to draw samples of $L_k$.

As illustrated in FIG. 6, when the polygon model imposes constraints on side length, the length $L_k$ of side k is prescribed by the polygon model.

$$q(L_k) = \begin{cases} A_L \cdot \psi\left(\dfrac{L_k - L_k^*}{\varepsilon_L L_k^*/w}\right) & L_k \geq 1 \\ 0 & L_k < 1 \end{cases} \qquad (4.12a)$$

In equation (4.12a), $A_L$ insures that $q(L_k)$ integrates to one. $\varepsilon_L \geq 0$ expresses allowable uncertainty in polygon side length as a fraction of the side length constraint $L_k^*$. Note that $$\lim_{\varepsilon_L \to 0} q(L_k) = \delta(L_k - L_k^*), \qquad (4.13)$$

The proposed state transition densities $q(\phi_k|\phi_{k-1})$ and $q(L_k)$ in equations (4.8) and (4.12a) have only two parameters, namely $\Delta_\phi$ and $\varepsilon_L$ respectively. Over time, nominal values for these parameters could be replaced by estimates derived from ensembles of previously matched polygons.

Given side k−1, $\phi_k$, and $L_k$, the location $[c_k, r_k]$ of corner k is known deterministically, so $p(c_k|\bullet)$ and $p(r_k|\bullet)$ are expressed in terms of Dirac delta functions:

$$p(c_k|c_{k-1}, L_k, \phi_k) = \delta(c_k - [c_{k-1} + L_k \cos \phi_k]) \qquad (4.5)$$

$$p(r_k|r_{k-1}, L_k, \phi_k) = \delta(r_k - [r_{k-1} + L_k \sin \phi_k]) \qquad (4.6)$$

5. Measurement Variables for Polygon Boundary Track Particles

Our particle filter for polygon boundary tracking also uses an observation $z_k$ (potentially a vector) of measurements made directly from pixel gray values that relate to corner k and side k of the polygon model match. Our observation $z_k$ has two components:

$$z_k = z(x_k) = v \cdot s_C(x_k) + (1-v) \cdot s_E(x_k) \in [0,1], \; 0 \geq v \geq 1 \qquad (5.1)$$

In Eq. (5.1) the corner similarity measurement component $s_C(x_k)$ characterizes the degree of GDM similarity between corner k in the polygon match and the field $\{\theta(c,r)\}$ of pixel gradient directions. And the edge similarity component $s_E(x_k)$ characterizes the degree of GDM similarity between side k in the polygon match (a linear edge terminating at corner k) and the gradient direction field $\{\theta(c,r)\}$ from equation (3.1). Special cases of $z_k$ include $s_C(x_k)$ when v=1, $s_E(x_k)$ when v=0, and the mean of $s_C(x_k)$ and $s_E(x_k)$ when v=½. Unlike the state vector in equation (4.1) which captures geometric information about polygon corners and sides, the measurement components in equation (5.1) capture photometric information about polygon corners and sides derived from pixel gray values in the image.

5.1 Corner Similarity Measurement

As previously discussed, corner similarities can easily be pre-computed and stored at each vertex pixel location over all corner orientations prior to boundary tracking because corner position and orientation are the only degrees of freedom. The corner similarity measurement is a GDM feature extracted from a corner similarity field computed prior to boundary tracking:

$$s_C(x_k) = s_C(c_k, r_k, \theta_k|\alpha_k) \in [0,1] \qquad (5.2a)$$

$$\alpha_k = \min(\alpha_k^*, 2\pi - \alpha_k^*) \in (0,\pi), \; \theta_k: \text{equation (2.2) is satisfied} \qquad (5.2b)$$

Equation (5.2b) leads to an acuteness value a for a convex corner, which in turn dictates the field $\{s_C(c, r, \theta|\alpha)\}$, k=0 . . . M−1 of pre-computed corner similarities to draw measurements $s_C(x_k)$ from.

5.2 Edge Similarity Measurement

The side or edge similarity measurement $s_E(x_k)$ is a GDM feature computed from the gradient direction field $\{\theta(c,r)\}$ (equation (3.1)) in the spatial domain as the boundary is being tracked. For a polygon side $x_k = [c_k, r_k, \phi_k, L_k]$, $s_E(x_k)$ is similar to equation (3.4) except $\mathcal{C}(\theta, \alpha)$ is replaced by $\epsilon(\phi_k, L_k)$ (the set of all pixels on the model of a polygon side of length L and thickness T with an endpoint at [0,0] pointing in direction $\phi$) and $\beta(c,r)$ is replaced by $\phi_k + \pi/2$:

$$s_E(x_k) = \sum_{(c,r) \in \varepsilon(\phi_k, L_k)} a(c+c_k, r+r_k) \cdot w(c,r) \cdot \sin^2[\theta(c+c_k, r+r_k) - \phi_k] \qquad (5.3)$$

Edge similarities (i.e. GDM feature for polygon sides) are computed as the boundary is being tracked because the degrees of freedom include not only line segment position and orientation, but also line segment length. For an image with m pixels, extraction of GDM features for corners is an O(m) proposition, whereas extraction of GDM features for polygon sides is an $$O\left(\binom{m}{2}\right)$$

proposition, which is computationally prohibitive. GDM features for polygon sides are instead computed on-demand as polygon boundaries are being tracked.

5.3 Measurement Density

For each particle i=1 . . . N and for all but the first and last side of the polygon, particle filters generate a new particle $x^i_k$ by sampling the state transition density $p(x_k|x^i_{k-1})$ once. The weight $w^i_k$ assigned to particle $x^i_k$ is related to the value of the measurements density $p(z_k|x^i_k)$. In our case, $p(z_k|x^i_k)$ physically represents the density of measurements associated with side k (or any side) of a polygon.

The measurements density will now be discussed in detail. Following the definition of the observation $z_k$ in equation (5.1), the measurements density can be expressed as $$p(z_k|x_k) = p(z(x_k)) = p(v \cdot s_C(x_k) + (1-v) \cdot s_E(x_k)) \qquad (5.4)$$

Figure 7:
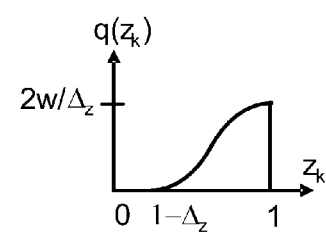
FIG. 7 is a graphical illustration of proposed measurement density for the observation (measurement) $z_k$.

In the initial absence of training data, we replace the measurements density $p(z(x_k))$ with a proposed measurements density $q(z(x_k))$ designed to be suitable for polygon boundary tracking. As illustrated in FIG. 7, for any k, an appropriate proposed density for $z_k$ is $$q(z) = \begin{cases} \frac{2w}{\Delta_z} \cdot \psi\left(\frac{z_k - 1}{\Delta_z/w}\right) & z_k \le 1 \\ 0 & z_k > 1 \end{cases} \quad (5.5)$$

where $0 < \Delta_z < 0.5$ is used to derive a lower bound $> 0.5$ on an allowable value for z. This density has only one parameter, $\Delta_z$. Over time, the nominal value for this parameter could be replaced by an estimate derived from ensembles of previously matched polygons.

6. Boundary Tracking for Polygons with Constrained Side Lengths

After the steps corner model matching and detecting corner best matches, the particle filtering approach to tracking polygon boundaries of the present invention performs three steps: (1) track initialization, which establishes the initial side k=0, (2) tracking polygon boundaries for intermediate sides 0<k<n−1, and (3) track termination which establishes the last side k=n−1.

6.1 Track Initialization: k=0

Track initialization occurs on step k=0 with the purpose of matching the initial side 0 of the polygon model. As mentioned in Section 4, the initial state $x_0 = [c_0, r_0, \phi_0, L_0]^T$ associated with side 0 of a polygon whose boundary is to be tracked is specified by a pair of corners $[c_a, r_a, \alpha_a, \theta_a]$ and $[c_b, r_b, a_b, \theta_b]$ drawn from the field of corners detected in the image as unambiguous matches to corners 0 and n−1 in the polygon model. The state variables are computed:

$$[c_0, r_0, \phi_0, L_0]^T = \left[c_b, r_b, \phi_0 = \tan^{-1}\frac{r_b - r_a}{c_b - c_a}, L_0 = \|[c_b - c_a, r_b - r_a]\|\right]^T \quad (6.1)$$

The constraints on corners a and b are corner acuteness: $\alpha_b = \min(\alpha_0^*, 2\pi - \alpha_0^*) \in (0, \pi)$ (6.2)

side length: $(1-\epsilon_L)L_0^* \le L_0 \le (1+\epsilon_L)L_0^*$ if $L_0^*$ is defined (6.3)

side pointing directions: $(\theta_a - \Delta_\phi - \alpha_a/2 + \pi) \le \phi_0 \le (\theta_a + \Delta_\phi - \alpha_a/2 + \pi)$ $(\theta_b - \Delta_\phi - \alpha_b/2 + \pi) \le -\phi_0 \le (\theta_b + \Delta_\phi - \alpha_b/2 + \pi)$ (6.4)

$\Delta_\phi$ and $\epsilon_L$ are tolerances on side length and pointing direction ($\Delta_\phi = 3°$ and $\epsilon_L = 0.1$ in our studies). The state vectors $\{x_0^i\}_{i=1}^N$ for the N initial particles are obtained by sampling from tight uniform distributions centered on $x_0$:

$$x_0^i = \begin{bmatrix} c_0^i \sim U(c_0 - \Delta, c_0 + \Delta) \\ r_0^i \sim U(r_0 - \Delta, r_0 + \Delta) \\ \phi_0^i \sim U(\phi_0 - \Delta_\phi, \phi_0 + \Delta_\phi) \\ L_0^i \sim U((1 - \varepsilon_L)L_0, (1 + \varepsilon_L)L_0) \end{bmatrix} \quad (6.5)$$

$\Delta$ is tolerance in corner location ($\Delta = 3$ in our studies).

This initialization procedure will track polygon boundaries in all matches for which side 0 is represented in the field of detected corners. It will not track polygon boundaries for matches in which side 0 is missing from the field of detected corners (because either corner 0 or corner 1 are missing). Thus the number of polygon matches is the number of distinct pairs of corners (consistent with sides of the polygon model) that can be drawn from the field of detected corners.

In the alternative, a more rigorous initialization procedure applies expressions (6.2)-(6.4) to n left cyclic shifts of the polygon model (equation (2.1)) by one. For instance, consider an n-sided polygon model with corners {0,1,2,3}. For a polygon in the image, if the corner corresponding to model corner 0 is not detected in the image, then the polygon cannot be initialized even if corners 1 and 2 are detected. However, by shifting the model (creating a model with corners {1,2,3,0}), the polygon can be initialized. Although this procedure can introduce match redundancy, no polygon match will be missed due to the fact that a particular side is missing from the field of detected corners.

6.2 Track Termination: k=n−1

Track termination occurs on step k=n−1 with the purpose of closing (completing) the polygon boundary with the last side n−1. The terminal state vector $x_{n-1} = [c_{n-1}, r_{n-1}, \alpha_{n-1}, \phi_{n-1}, L_{n-1}]^T$ associated with the last side of the tracked polygon boundary is completely specified once the previous n−1 sides are specified:

$$[c_{n-1}^i, r_{n-1}^i] = [c_0^i - L_0^i \cos\phi_0^i, r_0^i - L_0^i \sin\phi_0^i] \quad (6.6)$$

$$\phi_{n-1}^i = \tan^{-1}\frac{r_{n-1}^i - r_{n-2}^i}{c_{n-1}^i - c_{n-2}^i} \quad (6.7)$$

$$L_{n-1}^i = \|[c_{n-1}^i - c_{n-2}^i, r_{n-1}^i - r_{n-2}^i]\| \quad (6.8)$$

6.3 Tracking with the SIR Particle Filter: 0<k<n−1

The tracking step finds all but the first and last sides of the polygon match, i.e. it track sides 1 to n−2 of the polygon boundary. As such, it involves n−2 iterations k=1 ... n−2, one for each of the n−2 intervening polygon sides (iteration k=0 refers to initialization). Particle filters for polygon boundaries track N random samples or particles $x_k^i$, i=1 ... N of the state vector $x_k$ across iterations k=1 ... n−2 to produce N particle tracks $$x_{0:n-1}^i \triangleq \{x_k^i, k = 0 \ldots n-1\}, i = 1 \ldots N.$$

The initial state vector $x_0^i = [c_0^i, r_0^i, \phi_0^i, L_0^i]^T$ is obtained as described in Section 6.1. Then, on each iteration k=1 ... n−2, a set of N new particles $x_k^i$, i=1 ... N is generated by sampling the state transition density:

$$x_k^i \sim p(x_k | x_{k-1}^i), k = 1 \ldots n-2, i = 1 \ldots N \quad (6.9)$$

as shown in Section 4.1. On iteration n−1 (the termination step) and for i=1 ... N, the state vector $x_{n-1}^i$ is computed from $x_{n-2}^i$ and the polygon model $\mathcal{P}^*$ using equations (6.6 to 6.8).

In our case, given measurements $$z_{0:k} \triangleq \{z_j, j = 0 \ldots k\}$$

for sides 0 through k of a polygon boundary track, the posterior density $p(x_{0:k}^i | z_{0:k})$ physically represents the joint density of states for sides 0 through k of a true polygon match. The weight $w_k^i \ge 0$ associated with particle $x_k^i$ is related to $p(x_{0:k}^i | z_{0:k})$. The weights are normalized so that they sum to one:

$$w_k^j = w_k^j \bigg/ \sum_{j=1}^{N} w_k^j \qquad (6.10)$$

The sample-importance-resample (SIR) or bootstrap particle filter (See the Sample-Importance-Resample Particle Filter Iteration Algorithm in Section 7.2 of Appendix) uses a popular sub-optimal choice for particle weights $$w_k^i \propto p(z_k|x_k^i)$$

where the expression for $w_0^i$ applies to polygon side 0, and has been added for the special case of polygon boundary tracking.

A key feature of the SIR filter is a resampling step on each iteration that prevents particle weights from degenerating into a single dominant value as iterations progress. On each iteration, N resampled particles $\{\tilde{x}_k^i\}_{i=1}^{N}$ with normalized weights $\{\tilde{w}_k^i\}_{i=1}^{N}$ are drawn from the original set of particles $\{x_k^i\}_{i=1}^{N}$ with normalized weights $\{w_k^i\}_{i=1}^{N}$ using the Particle Resampling Algorithm described in Section 7.1 of the Appendix. The idea is to select samples with higher weights more often than samples with lower weights. Samples with higher weights are often selected multiple times by the resampler, whereas samples with lower weights are often not selected at all (i.e., they are often eliminated by the resampler).

Resampling involves a staircase distribution formed by integrating a 1D density composed of N impulses with weights $w_k^i$, $i=1 \ldots N$. Resampled particles are obtained by sampling the range [0,1] of distribution values uniformly N times. Thus for SIR filters, $w_{k-1}^i=1$ in expression (6.11), which gives rise to the modified expression $$w_k^i = p(z_k|x_k^i), k=0 \ldots n-1, i=1 \ldots N \qquad (6.12)$$

followed by weight normalization according to equation (6.10). Also, on iteration k, original particles $x_k^i$ (and their parents from previous iterations) with indices $j=j_k(i)$ are mapped to resampled particles $\tilde{x}_k^i$ with indices i, i.e., $$\tilde{x}_g^i = x_g^{j_k(i)}, g = 0 \ldots k-1 \qquad (6.13)$$

where $j_k(i)$ is the index of the original particle mapped to the resampled particle with index i on iteration k. The weights assigned to resampled particles are all equal, $\tilde{w}_k^i = 1/N$ The resampled particles can be much less diverse than the input particles. This can potentially result in another problem known as sample impoverishment, which leads to a condition in which all particles collapse into a single point within a few iterations. Sample impoverishment is not likely to be a problem for us since the number of tracking iterations (the number of polygon sides) is typically small, and we use proposed state transition densities with non-negligible uncertainties.

6.4 Exemplary Embodiment of Polygon Boundary Tracking Methodology for Constrained Side Lengths To illustrate the polygon boundary tracking method of the present invention, suppose two corners $[c_0,r_0]$ and $[c_1,r_1]$ compliant with the first side in some cyclic shift of $\mathcal{P}^*$ have been drawn from a field of corners previously detected in an image $\{u(c,r)\}$ as described in Section 3.3, as a preliminary step. The algorithm for polygon boundary tracking with particle filters shown in Section 7.3 of the Appendix then proceeds with an initialization step, a tracking step, and a termination step. The tracking step in particular involves the SIR Particle Filter Algorithm of Section 7.2 of the Appendix, as well as the Particle Resampling Algorithm of Section 7.1 of the Appendix.

FIGS. 11 and 12 show the results of an example of boundary tracking for polygons with constrained side lengths using the methodology of the present invention. As can be seen, the results of the particle filter approach to polygon boundary tracking of the present invention can be produced in graphic form on a display, together with the original image, so as that the detected polygon structures/objects in the image may be identified.

6.5 Track Blending

For polygon models with absolute or relative side length constraints, tracks $i=1 \ldots N$ all attempt to track the same polygon boundary. Each attempt $x_{0:n-1}^i$ $i=1 \ldots N$ is a sequence of n states that can be viewed as a sample of some random vector $X_{0:n-1}$ of states representing the true polygon boundary. The true boundary can be modeled as the expectation $E[X_{0:n-1}]$ of this random vector. The polygon match is an estimate $\hat{E}[X_{0:n-1}]$ of the true boundary. The blended track $\hat{E}[X_{0:n-1}] = X_{0:n-1} = \{x_k = [c_k, r_k, \phi_k, L_k]^T, k=0 \ldots n-1\}$ (a sequence of n states) can be formed as a weighted average of tracks $i=1 \ldots N$:

$$[c_k, r_k] = \sum_{i=1}^{N} q(z(x_k^i)) \cdot [c_k^i, r_k^i] \bigg/ \sum_{i=1}^{N} q(z(x_k^i)), \qquad (6.15)$$

$$k = 0 \ldots n-1$$

$$[\phi_k, L_k] = \left[\tan^{-1} \frac{r_k - r_{k-1}}{c_k - c_{k-1}}, \|c_k - c_{k-1}, r_k - r_{k-1}\|\right] \qquad (6.16)$$

where $[c_n, r_n] = [c_0, r_0]$. There is exactly one blended particle track for each detected polygon. Initialization sides that correspond to a previously blended track can be ignored.

6.6 Ranking of Blended Tracks

Motivated by equation (5.1), one intuitive ranking measure for the blended track is $$w_{0:n-1} = \qquad (6.17)$$

$$\frac{v}{n \cdot \max(q(z))} \sum_{k=0}^{n-1} q(z = s_C(x_k)) + \frac{1-v}{\max(q(z))} \frac{\sum_{k=0}^{n-1} L_k \cdot q(z = s_E(x_k))}{\sum_{k=0}^{n-1} L_k}$$

$w_{0:n-1} \in [0,1]$ calculates contributions from corner and edge similarities separately. The contribution from corner similarities is averaged evenly across all sides. The contribution from edge similarities is a weighted average across all sides in which the weight associated with a particular side is proportional to its length. $w_{0:n-1}$ allows different matches to the same polygon model $\mathcal{P}^*$ to be ranked relative to one-another. It has several advantages:

(1) The importance of corners relative to sides can be specified:
As v increases, $w_{0:n-1}$ becomes more sensitive to missing corners and less sensitive to missing sides.

(2) Undetected corners and sides are handled:
Our measure seeks states $x_k$ for which $s_C(x_k)$ and $s_E(x_k)$ are large. It thus copes with corners that cannot necessarily be found with a corner detector because $s_C(x_k)$ can be large even if no corner is detected at $x_k$.

It also copes with sides that cannot necessarily be found with an edge detector because $s_E(x_k)$ can be large even if no edge is detected along the side emanating from $x_k$.

6.7 Complexity Minimization for Edge Matching

The cost of polygon matching is dominated by the cost of computing edge similarities $s_E(x^i_k)$ over all sides $k=1 \ldots n-2$ and all particles $i=1 \ldots N$ as the boundary is being tracked. By brute force, nN edge similarity calculations are required in order to generate a single polygon match. The number of edge similarity calculations per polygon match can be reduced by a factor of N to only n by recognizing that for polygon models with constrained side lengths and for any side k: $0<k<n-1$, one can expect $s_E(x^i_k)$ to be relatively constant for $i=1 \ldots N$. In this case, if v is not too close to 0, the measurement variable $z(x^i_k)$ in equation (5.1) can be replaced by $$z'(x^i_k) = s_C(x^i_k) \tag{6.18}$$

which is pre-computed prior to boundary tracking. However, when the rank $w_{0:n-1}$ in equation (6.10) is computed for the blended track, it is important to revert back to the measurement variable $z(x_k)$ in equation (5.1) (which explicitly takes $s_E(x_k)$ into account) so that different polygon matches can be accurately compared. Fortunately, this process requires only n edge similarity calculations.

6.8 Track Redundancy

For models of polygons with constrained side lengths, our particle tracking approach produces exactly one blended boundary track (i.e., one polygon match) for each pair of detected corners that is geometrically consistent with some side of the polygon model. Since tests for geometrical consistency are applied to all n sides of the polygon model (Section 4.1), it is possible to match a single polygon in the image multiple times. Redundant boundary tracks can be prevented by ignoring pairs of model-consistent corners that are also geometrically consistent with some side of a blended boundary track that already exists. Mathematically, a pair of detected corners $[c_0, r_0, \alpha_0, \phi_0]$ and $[c_1, r_1, \alpha_1, \phi_1]$ is geometrically consistent with the first two corners $\{[c_a, r_a, \alpha_a, \phi_a], [c_b, r_b, \alpha_b, \phi_b]\}$ of a pre-existing blended boundary track if the locations, orientations, and acutenesses are sufficiently close:

$$\alpha_0 = \alpha_a, \alpha_1 = \alpha_b \tag{6.19}$$

$$|\phi_0 - \phi_a| + |\phi_1 - \phi_b| < \epsilon_\phi \tag{6.20}$$

$$\|[c_0-c_a, r_0-r_a]\| + \|[c_1-c_b, r_1-r_b]\| < \epsilon_d \tag{6.21}$$

7. Appendix

7.1 Particle Resampling Algorithm $\{\tilde{x}^i_k, \tilde{w}^i_k\}^N_{i=1} = \text{particleFilterResample}(\{x^i_k, w^i_k\}^N_{i=1})$ 1. Generate a staircase distribution from particles:
   $P_k(0) = 0$
   for $i = 1 \ldots N$
   $P_k(i) = P_k(i-1) + w^i_k$
2. Sample the staircase distribution using a transformational method:
   for $i = 1 \ldots N$
   $y \sim U(0,1)$
   resample: $j_k(i) = x(i): P_k(x(i)) \leq y < P_k(x(i)+1)$
   $\tilde{x}^i_g = x^{j_k(i)}_g, g = 0 \ldots k-1$. $\tilde{w}^i_k = 1/N$

7.2 Sample-Importance-Resample Particle Filter Iteration Algorithm $\{x^i_k, w^i_k\}^N_{i=1} = \text{SIRparticleFilterIteration}(\{x^i_{k-1}, w^i_{k-1}\}^N_{i=1}, \{u(c,r)\}, \mathcal{P}^*) (k>0)$ 1. Sample and compute importance weights:
   for $i = 1 \ldots N$
   sample: draw $x^i_k \sim p(x_k|x^i_{k-1})$ (requires $\mathcal{P}^*$)
   compute importance weights: $w^i_k = p(z_k|x^i_k)$ (requires $\{u(c,r)\}, \mathcal{P}^*$)
2. Normalize importance weights:
   - for $i = 1 \ldots N$
   - $w^i_k = w^i_k / \sum_{j=1}^{N} w^j_k$ 3. Resample:

$\{x^i_k, w^i_k\}^N_{i=1} \leftarrow \{\tilde{x}^i_k, \tilde{w}^i_k\}^N_{i=1} = \text{particleFilterResample}(\{x^i_k, w^i_k\}^N_{i=1})$

7.3 Polygon Boundary Tracking Algorithm $\{x^i_{0:n-1}, w^i_{0:n-1}\}^N_{i=1} = \text{polygonBoundaryTrack}([c_a, r_a], [c_b, r_b], \{u(c,r)\}, \mathcal{P}^*)$ 1. Initialize:

- $x_0 = \left[c_b\ r_b\ \phi_0 = \tan^{-1}\frac{r_b - r_a}{c_b - c_a}\ L_0 = \|[c_b - c_a, r_b - r_a]\|\right]^T$

- for $i = 1 \ldots N$

- $x^i_0 = \begin{bmatrix} c^i_0 \sim U(c_0 - \Delta, c_0 + \Delta) \\ r^i_0 \sim U(r_0 - \Delta, r_0 + \Delta) \\ \phi^i_0 \sim U(\phi_0 - \Delta_\phi, \phi_0 + \Delta_\phi) \\ L^i_0 \sim U((1-\epsilon_L)L_0, (1+\epsilon_L)L_0) \end{bmatrix}$, $w^i_0 = 1/N$ 2. Track:
for $k = 1 \ldots n-2$
$\{x^i_k, w^i_k\}^N_{i=1} = \text{SIRparticleFilterIteration}(\{x^i_{k-1}, w^i_{k-1}\}^N_{i=1}, \{u(c,r)\}, \mathcal{P}^*)$ 3. Terminate:

- for $i = 1 \ldots N$

- $x^i_{n-1} = \begin{bmatrix} c^i_{n-1} = c^i_0 - L^i_0 \cos\phi^i_0 \\ r^i_{n-1} = r^i_0 - L^i_0 \sin\phi^i_0 \\ \phi^i_{n-1} = \tan^{-1}\frac{r_{n-1} - r^i_{n-2}}{c_{n-1} - c^i_{n-2}} \\ L^i_{n-1} = \|[c_{n-1} - c^i_{n-2}, r_{n-1} - r^i_{n-2}]\| \end{bmatrix}$ While particular operational sequences, materials, parameters, and particular embodiments have been described and or illustrated, such are not intended to be limiting. Modifications and changes may become apparent to those skilled in the art, and it is intended that the invention be limited only by the scope of the appended claims.

We claim:

1. A method in a computer system for detecting polygon boundaries of structures in an image, comprising:
   receiving an image;
   detecting in said image a set of polygon corners each substantially matching one of n corner models of an n-sided polygon model based on directions of gradients in pixel gray-values of said image;
   initializing tracking of polygon boundaries by selecting pairs of corners from the set of detected polygon corners which match the first $0^{th}$ and last $(n-1)^{th}$ corners models of the n-sided polygon model, wherein each selected pair defines a first $0^{th}$ side of a corresponding one of the polygon boundaries;

using a particle filter performing Sequential Monte Carlo sampling to track intermediate sides of the polygon boundaries after the first $0^{th}$ side up to and including a penultimate $(n-2)^{th}$ side, wherein the particles used in the particle filter characterize the states of the polygon boundary sides, and observations used in the particle filter characterize the match similarity between the set of detected polygon corners at locations and orientations predicted by the polygon model;

terminating tracking of the polygon boundaries by determining the last $(n-1)^{th}$ sides thereof based on specified states of the sides of the polygon boundaries for the previous n−1 sides; and blending multiple particle tracks for the same polygon into a single boundary based on importance weights that reflect particle fitness, to produce an array of polygon matches detected in said image.

2. The method of claim 1, further comprising ranking the blended particle tracks based on corner fitness contributions and edge fitness contributions in user-specified proportions.

3. The method of claim 1, wherein the corner models are gradient direction corner models, and the step of detecting the set of polygon corners comprises: for each of M corner model orientations per pixel in said image, determining n corner similarity values as a gradient direction matching (GDM) feature between the direction of the gradient in the pixel gray-value and the n gradient direction corner models; and determining as polygon corners those pixels satisfying predetermined GDM feature thresholds.

4. The method of claim 2, wherein the predetermined GDM feature thresholds include those pixels determined to be unambiguous local maxima above a threshold magnitude in a set of optimal GDM feature values.

5. The method of claim 1, wherein in the initialization step, the selection of the pairs of corners are based on each of n cyclic shifts of the n-sided polygon model.

6. The method of claim 1, further comprising providing the array of polygon matches for use by a user.

7. The method of claim 6, wherein the array of polygon matches is graphically rendered for display.

8. A method in a computer system for detecting polygon boundaries of structures in an image, comprising:

computing a set of similarity values characterizing the degree of matching between an estimated gradient direction of each of M corner orientations of each pixel to a gradient direction model of a corner of predetermined acuteness $\alpha$ of a polygon model;

determining a set of best matching corners from the set of similarity values by finding unambiguous local maxima of predetermined sufficient magnitude in the set of similarity values;

initializing tracking of polygon boundaries by selecting pairs of corners from the set of detected polygon corners which match the first $0^{th}$ and last $(n-1)^{th}$ corners models of the n-sided polygon model, wherein each selected pair defines a first $0^{th}$ side of a corresponding one of the polygon boundaries;

tracking intermediate sides of the polygon boundaries using a particle filter performing SMC sampling, including a penultimate $(n-2)^{th}$ side;

terminating polygon boundary tracking by determining the last $(n-1)^{th}$ side of the tracked polygon boundaries based on boundary values up to the $(n-1)^{th}$ side, to close the polygon boundaries; and blending the polygon boundary tracks to produce polygon match data identifying polygon structures in the image.

9. A computer system for detecting polygon boundaries of structures in an image, comprising:

input means for receiving the image;

a first data processing module for detecting in said image a set of polygon corners each substantially matching one of n corner models of an n-sided polygon model based on directions of gradients in pixel gray-values of said image;

a second data processing module initializing tracking of polygon boundaries by selecting pairs of corners from the set of detected polygon corners which match the first $0^{th}$ and last $(n-1)^{th}$ corners models of the n-sided polygon model, wherein each selected pair defines a first $0^{th}$ side of a corresponding one of the polygon boundaries;

a third particle filtering module for performing Sequential Monte Carlo sampling to track intermediate sides of the polygon boundaries after the first $0^{th}$ side up to and including a penultimate $(n-2)^{th}$ side, wherein the particles used in the particle filter characterize the states of the polygon boundary sides, and observations used in the particle filter characterize the match similarity between the set of detected polygon corners at locations and orientations predicted by the polygon model;

a fourth data processing module for terminating tracking of the polygon boundaries by determining the last $(n-1)^{th}$ sides thereof based on specified states of the sides of the polygon boundaries for the previous n−1 sides; and a fifth data processing module for blending multiple particle tracks for the same polygon into a single boundary based on importance weights that reflect particle fitness, to produce an array of detected polygon matches;

output means for making the array of detected polygon matches available for use.

* * * * *